United States Patent
Kawano et al.

(10) Patent No.: US 9,924,149 B2
(45) Date of Patent: Mar. 20, 2018

(54) VIDEO QUALITY EVALUATION APPARATUS, METHOD AND PROGRAM

(71) Applicant: NIPPON TELEGRAPH AND TELEPHONE CORPORATION, Chiyoda-ku (JP)

(72) Inventors: Taichi Kawano, Musashino (JP); Kazuhisa Yamagishi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 315 days.

(21) Appl. No.: 14/359,490

(22) PCT Filed: Dec. 5, 2012

(86) PCT No.: PCT/JP2012/081573
§ 371 (c)(1),
(2) Date: May 20, 2014

(87) PCT Pub. No.: WO2013/084965
PCT Pub. Date: Jun. 13, 2013

(65) Prior Publication Data
US 2014/0320598 A1    Oct. 30, 2014

(30) Foreign Application Priority Data

Dec. 5, 2011  (JP) ................................. 2011-265991
Jun. 29, 2012 (JP) ................................. 2012-147276

(51) Int. Cl.
*H04N 13/00*  (2006.01)
*H04N 17/00*  (2006.01)

(52) U.S. Cl.
CPC ....... *H04N 13/0022* (2013.01); *H04N 17/004* (2013.01); *H04N 2013/0074* (2013.01)

(58) Field of Classification Search
CPC ............ H04N 13/0022; H04N 17/004; H04N 2013/0074; H04N 13/00
(Continued)

(56) References Cited

U.S. PATENT DOCUMENTS 8,594,180 B2    11/2013  Yang et al.
2008/0198920 A1*  8/2008  Yang .................. H04N 13/0018
                                                          375/240.01
(Continued)

FOREIGN PATENT DOCUMENTS

CN    101627635 A        1/2010
CN    101872479 A   *    6/2010
(Continued)

OTHER PUBLICATIONS

Office Action and Search Report dated Aug. 5, 2015 in the corresponding Chinese Patent Application No. 201280058954.7 (with English Translation of Category of Cited Documents).
(Continued)

*Primary Examiner* — Tung Vo
*Assistant Examiner* — Zaihan Jiang
(74) *Attorney, Agent, or Firm* — Oblon, McClelland, Maier & Neustadt, L.L.P.

(57) ABSTRACT

A video quality evaluation apparatus for evaluating a video quality that a user experiences for a service in which a 3D video is used, the video quality evaluation apparatus including: a 2D video quality derivation unit configured to derive, from input 3D video data, a left eye video quality that is a quality of a left eye video that is included in the 3D video data and a right eye video quality that is a quality of a right eye video that is included in the 3D video data; and a 3D video quality derivation unit configured to derive a quality of the 3D video from the left eye video quality and the right eye video quality.

5 Claims, 7 Drawing Sheets

(58) Field of Classification Search
USPC .......................................................... 348/43
See application file for complete search history.

(56) References Cited

U.S. PATENT DOCUMENTS

2009/0304263 A1    12/2009   Engelberg et al.
2010/0245547 A1*    9/2010   Tanaka ............... H04N 13/0029
                                                        348/51
2012/0262549 A1*   10/2012   Ferguson ........... H04N 13/0018
                                                        348/46

FOREIGN PATENT DOCUMENTS

| CN | 101872479 A | 10/2010 |
| JP | 2000 276595 | 10/2000 |
| JP | 2000 278719 | 10/2000 |
| JP | 2001 292449 | 10/2001 |
| JP | 2006 525559 | 11/2006 |
| JP | 2010 519856 |  6/2010 |

OTHER PUBLICATIONS

"Objective perceptual video quality measurement techniques for digital cable television in the presence of a full reference", ITU-T Recommendation, J.144, Rev. 1, pp. 1-160, (Mar. 2004).

"Objective perceptual multimedia video quality measurement in the presence of a full reference", ITU-T Recommendation, J.247, pp. 1-125, (Aug. 2008).

Kawano, T., et al., "Study on no-reference type hybrid video quality assessment model", IEICE Technical Report CQ2010-66, pp. 103-108, (Nov. 2010) (with English abstract).

Yamagishi, K., et al., "Parametric Packet-Layer Model for Monitoring Video Quality of IPTV Services", IEEE ICC 2008, CQ04-3, pp. 110-114, (May 2008).

Horita, Y., et al., "Quality Evaluation Model of Coded Stereoscopic Color Image", IPSJ SIG Technical Reports, 2000(24), pp. 31-36, (Mar. 3, 2000) (with English abstract).

Yamagishi, K., et al., "Impact of Difference in Video Quality between Left and Right Views on 3D Video Quality" Transactions in the Conference in 2012 of the Institute of Electronics, Information and Communication Engineers (IEICE), p. 457, (Mar. 20-23, 2012) (with English translation).

International Search Report dated Mar. 5, 2013 in PCT/JP12/81573 Filed Dec. 5, 2012.

Extended European Search Report dated Jun. 22, 2015 in Patent Application No. 12854733.8.

Junyong You, et a., "Perceptual quality assessment for stereoscopic images based on 2D image quality metrics and disparity analysis" Research Council of Norway, XP055195540, Jan. 1, 2010, 6 pages.

* cited by examiner

VIDEO QUALITY EVALUATION APPARATUS, METHOD AND PROGRAM

TECHNICAL FIELD

The present invention relates to a video quality evaluation apparatus, a method and a program. More particularly, the present invention relates to a video quality evaluation apparatus, a method and a program for quantifying stereoscopic (3D) video quality that a user experiences with respect to a service that uses 3D videos.

BACKGROUND ART

Owing to development of Blue-ray 3D and HDMI 1.4 standard, and standardization of H.264/MVC and the like, an environment where 3D content can be viewed even in a standard home has been prepared. With that, also in video distribution services and package media, 3D video content is started to be provided in addition to 2D video content.

In the video distribution services and the package media, information amount compression of video content using video coding is performed in order to improve use efficiency of the network and the storage and to reduce service cost. By performing the information amount compression using video coding, deterioration such as mosaic-like distortion (block noise), blurring, bleeding, jerky feeling and the like occurs in the 2D video and the 3D video so that quality that the user experiences (QoE (Quality of Experience) deteriorates.

Also, in a video distribution service via a network, when defect or corruption occurs in a part of data of the 2D video and the 3D video due to congestion of the network and the like, deterioration occurs in the 2D video and the 3D video, so that QoE deteriorates.

For providing the service with good quality, and for detecting quality deterioration quickly, it is important to provide quality design in advance of service providing and to provide quality management while providing the service. For this purpose, an easy and efficient video quality evaluation technique is necessary for properly quantifying quality that the user experiences.

In the past, a technique has been proposed for quantifying quality of 2D video based on pixel information of the 2D video or header information of packets including the 2D video (refer to non-patent documents 1-4, for example).

RELATED ART DOCUMENT

[Non-patent document 1] ITU-T Recommendation J. 144
[Non-patent document 2] ITU-T Recommendation J. 247
[Non-patent document 3] Taichi Kawano, Keishiro Watanabe, and Jun Okamoto, "Study on no-reference type hybrid video quality assessment model," IEICE Tech. Rep., CQ2010-66, November 2010.
[Non-patent document 4] K. Yamagishi and T. Hayashi, "Parametric Packet-Layer Model for Monitoring Video Quality of IPTV Services," IEEE ICC 2008, CQ04-3, May 2008.
[Non-patent document 5] Yuukou Horita, Yoshinao Kawai, Yohko Minami, Tadakuni Murai, Yoshio Nakashima, "Quality Evaluation Model of Coded Stereoscopic Color Image," IPSJ SIG Technical Reports, 2000(24), 31-36, March 2000

SUMMARY OF THE INVENTION

Problem to be Solved by the Invention

However, since the techniques described in the non-patent documents 1-4 are video quality evaluation techniques for 2D video, the techniques cannot directly support quality evaluation of 3D video. As a method for supporting quality evaluation of the 3D video, an approach can be considered in which a left eye video and a right eye video included in the 3D video data are regarded as two 2D videos, and quality of each 2D video is calculated by using a 2D video quality evaluation algorithm (techniques described in the non-patent documents 1-4, for example) so as to calculate an average value of the qualities of the two 2D videos as a quality of the 3D video. FIG. 1 shows a relationship between the average value of the 2D video quality of the left eye video and the 2D video quality of the right eye video, and 3D video quality. Types of plotted points are classified into videos in which a difference of 2D video quality between the left eye video and the right eye video is large and videos in which the difference is small. As shown in FIG. 1, it can be understood that, as to videos in which the difference of 2D video quality between the left eye video and the right eye video is large, 3D video quality cannot be calculated accurately by the method using average values.

The present invention is contrived in view of the above matter, and an object of the present invention is to provide a 3D video evaluation apparatus, a method and a program for calculating a 3D video quality accurately from 2D video qualities of the left eye video and the right eye video.

Means for Solving the Problem

For solving the above-mentioned problem, the present invention is a video quality evaluation apparatus for evaluating a video quality that a user experiences for a service in which a 3D video is used, the video quality evaluation apparatus including:

a 2D video quality derivation unit configured to derive, from input 3D video data, a left eye video quality that is a quality of a left eye video that is included in the 3D video data and a right eye video quality that is a quality of a right eye video that is included in the 3D video data; and a 3D video quality derivation unit configured to derive a quality of the 3D video from the left eye video quality and the right eye video quality.

Effect of the Present Invention

According to the present invention, a 3D video quality can be calculated with high accuracy by using a model equation defined based on experiment results on influences that are exerted, on the 3D video, by 2D video qualities of the left eye video and the right eye video of the 3D video, which leads to proper quality design for a service in which the 3D video is used, and to realization of quality monitoring in service providing, so that the present invention can contribute to improvement of service value in quality.

EMBODIMENTS FOR CARRYING OUT THE INVENTION

In the following, an embodiment of the present invention is described with reference to figures.

In the embodiment of the present invention, first, a 2D video quality (left eye video quality) of a left eye video included in a 3D video and a 2D video quality (right eye video quality) of a right eye video are calculated by using an existing 2D video quality evaluation algorithm. Then, a 3D video quality is calculated from the left eye video quality and the right eye video quality by using a relationship model, which is obtained by experiment, among the left eye video quality, the right eye video quality and the 3D video quality.

The relationship among the left eye video quality, the right eye video quality and the 3D video quality is described below.

Figure 1:
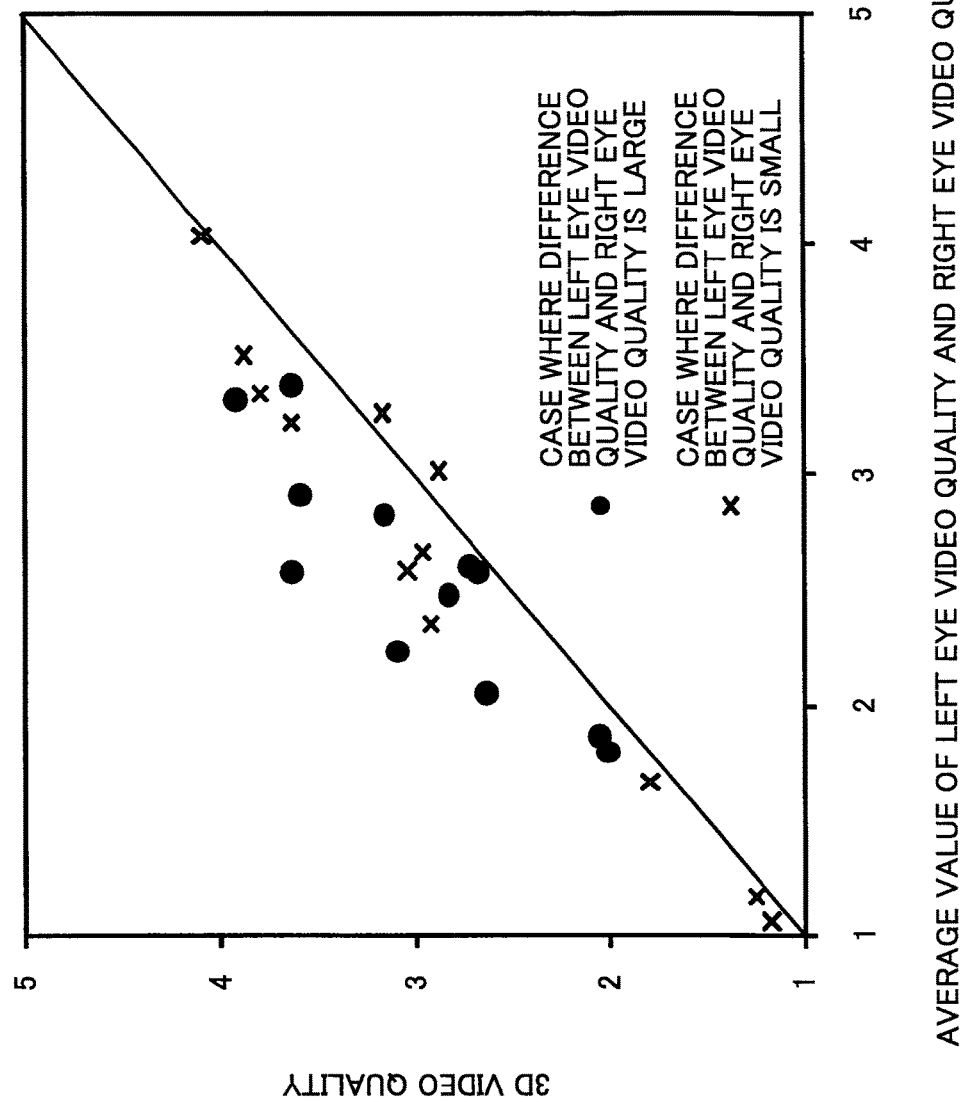
FIG. 1 is a diagram showing a relationship between an average value of a left eye video quality and a right eye video quality, and a 3D video quality.
Figure 2:
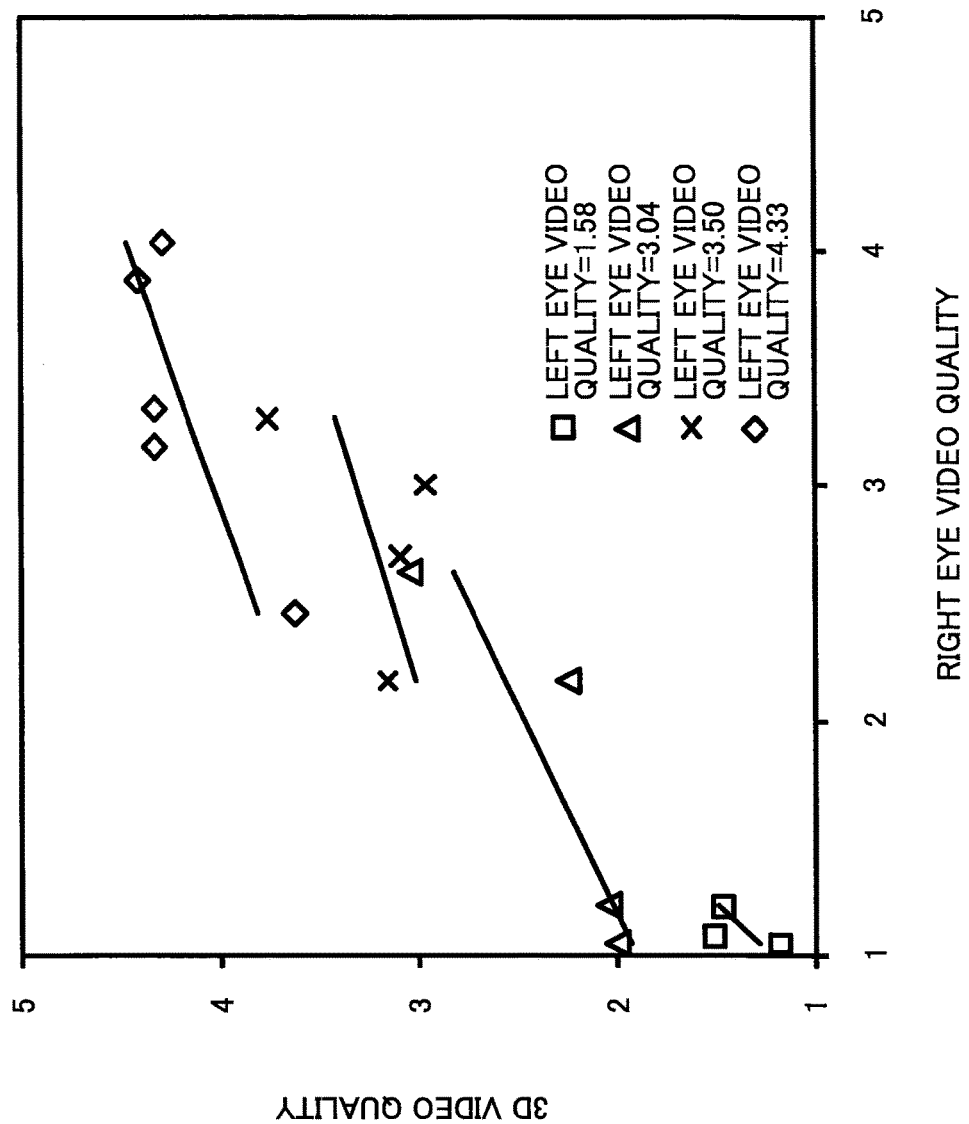
FIG. 2 is a diagram showing a relationship among the left eye video quality, the right eye video quality and the 3D video quality.

First, a relationship is described when the left eye video quality is higher than the right eye video quality. FIG. 2 shows the relationship among the left eye video quality, the right eye video quality and the 3D video quality, in which only points where the left eye video quality is higher than the right eye video quality are plotted. Difference of types of plotted points indicates difference of the left eye video quality, and the lateral axis indicates the right eye video quality and the vertical axis indicates the 3D video quality. A line segment in the figure indicates a regression line of the right eye video quality and the 3D video quality for each type of the plotted points. In a case where the left eye video quality is the same, there is a relationship that, the lower the right eye video quality is, the lower the 3D video quality is. But, the degree of the relationship is gradual, and, it can be understood that the left eye video quality of high quality has a larger effect on the 3D video quality than the right eye video quality (quality characteristic 1).

Next, a relationship when the right eye video quality is higher than the left eye video quality is described. According to the non-patent document 5: Yuukou Horita, Yoshinao Kawai, Yohko Minami, Tadakuni Murai, Yoshio Nakashima, "Quality Evaluation Model of Coded Stereoscopic Color Image," IPSJ SIG Technical Reports, 2000(24), 31-36, March 2000, even though the left eye video quality and the right eye video quality are reversed, how the quality exerts influences on the 3D video quality does not change, and it can be said that, when the right eye video quality is higher than the left eye video quality, the right eye video quality has a larger effect on the 3D video quality than the left eye video quality (quality characteristic 2).

In FIG. 2, quality characteristics are derived by limiting to the condition where the left eye video is higher than the right eye video, and FIG. 2 shows that the 3D video quality has a high correlation with the left eye video quality, and in addition to that, FIG. 2 shows a relationship (quality characteristic 1) in which the 3D video quality gradually falls as the right eye video quality falls. At this time point, the case where quality of the left and right videos is reversed is not considered. Next, based on the characteristic that the 3D video quality does not change even though the quality of the right eye video and the left eye video is reversed (quality characteristic 2), it can be derived that there is a characteristic (quality characteristic 3) similar to the quality characteristic 1 also in a condition where the right eye video is higher than the left eye video. Based on the quality characteristic 1 and the quality characteristic 3, it can be understood that there is a relationship that the 3D video quality is largely influenced by a video of higher quality in the left eye video and the right eye video, and that the 3D video quality is slightly influenced by a video of lower quality. Therefore, the 3D video quality can be calculated by classifying the left eye video and the right eye video into a video of high quality (base video) and a video of low quality (sub-video) and by performing correction based on the quality of the base video (base video quality) using the quality of the sub-video (sub-video quality).

More specifically,

Quality characteristics 1: "3D video quality=A(left eye video quality, right eye video quality) if left eye video quality≥right eye video quality", wherein A(M, N) indicates a function for calculating a 3D video quality by performing correction using a quality value N based on a quality value M, and Quality characteristics 2: "3D video quality=B(left eye video quality, right eye video quality)=B(right eye video quality, left eye video quality)" are obtained, wherein B(M, N) indicates a function for calculating a 3D video quality from the quality value M and the quality value N, and A(M, N) is a form of B(M, N).

From the quality characteristics 1 and 2, Quality characteristics 3: "3D video quality=A(right eye video quality, left eye video quality) if right eye video quality≥left eye video quality" is obtained, and from the quality characteristics 1 and 3, "3D video quality=A(base video quality, sub-video quality)" is obtained.

Figure 3:
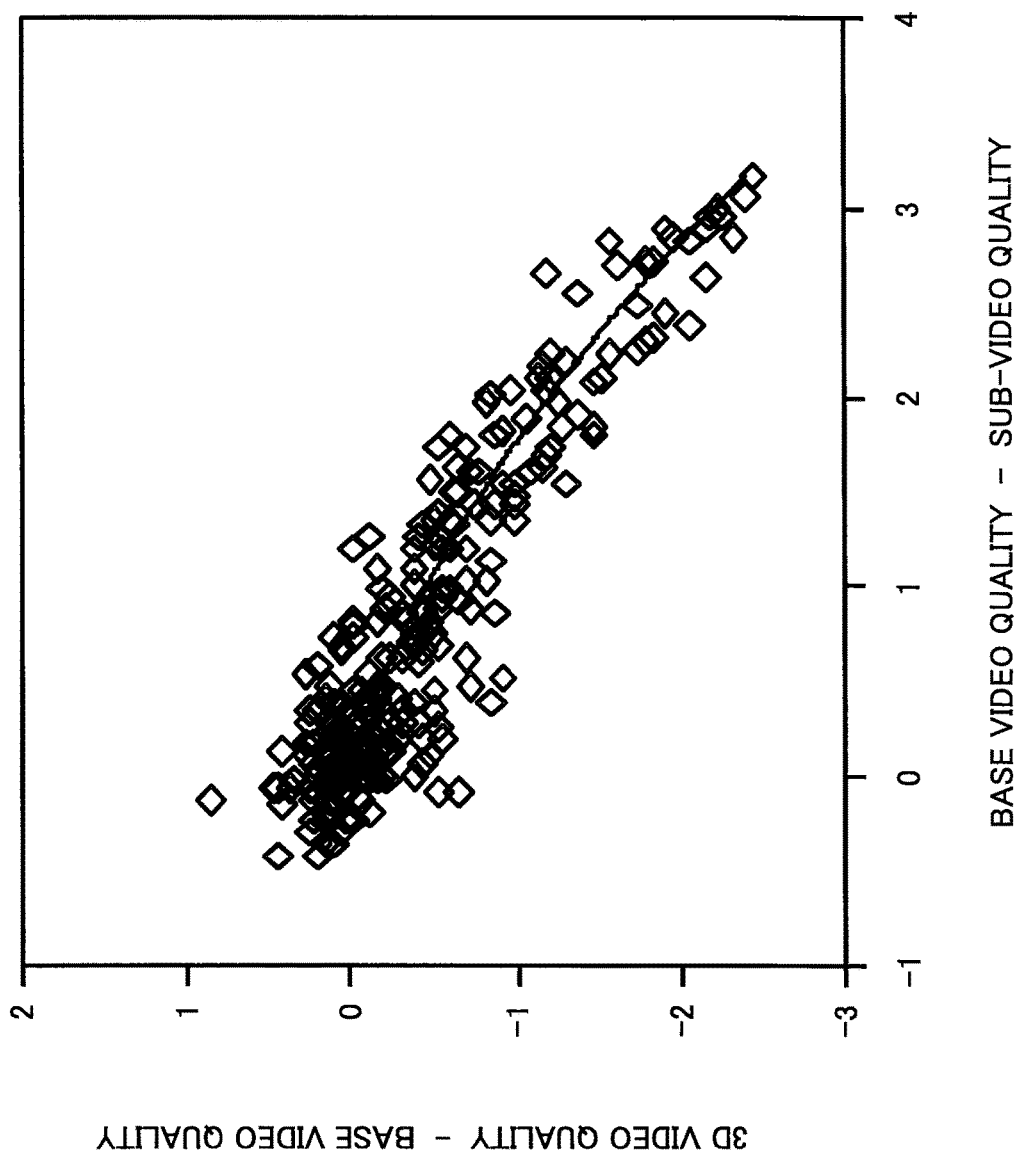
FIG. 3 is a diagram showing a relationship of a difference value between the 3D video quality and a base video quality and a difference value between the base video quality and a sub-video quality.

FIG. 3 indicates a relationship of a difference value between the 3D video quality and the base video quality and a difference value between the base video quality and the sub-video quality, and FIG. 3 indicates that the 3D video quality is influenced by the difference value between the base video quality and the sub-video quality. For deriving the 3D video quality, a correction is performed such that the difference value between the base video quality and the sub-video quality is subtracted from the base video quality (a correction such that the 3D video quality is decreased than the base video quality as the difference value becomes large). Details of the correction are described in equations (1)-(6). Also, as shown in the figure, since there is a non-linear relationship in the difference value between the 3D video quality and the base video quality and the difference value between the base video quality and the sub-video quality, it becomes possible to improve estimation accuracy of the 3D video quality by introducing model equations for which non-linearity is considered. Details of the correction is described later in equations (5) and (6).

The present invention is an apparatus and a method for calculating a quality of a 3D video. More specifically, a left eye video quality of the 3D video and a right eye video quality of the 3D video are calculated separately, so that a 3D video quality is calculated from these qualities.

The present invention is characterized in that the 3D video quality is calculated based on model equations defined based on experiment results on influences that are exerted by the left eye video quality and the right eye video quality on the quality of the 3D video.

Figure 4:
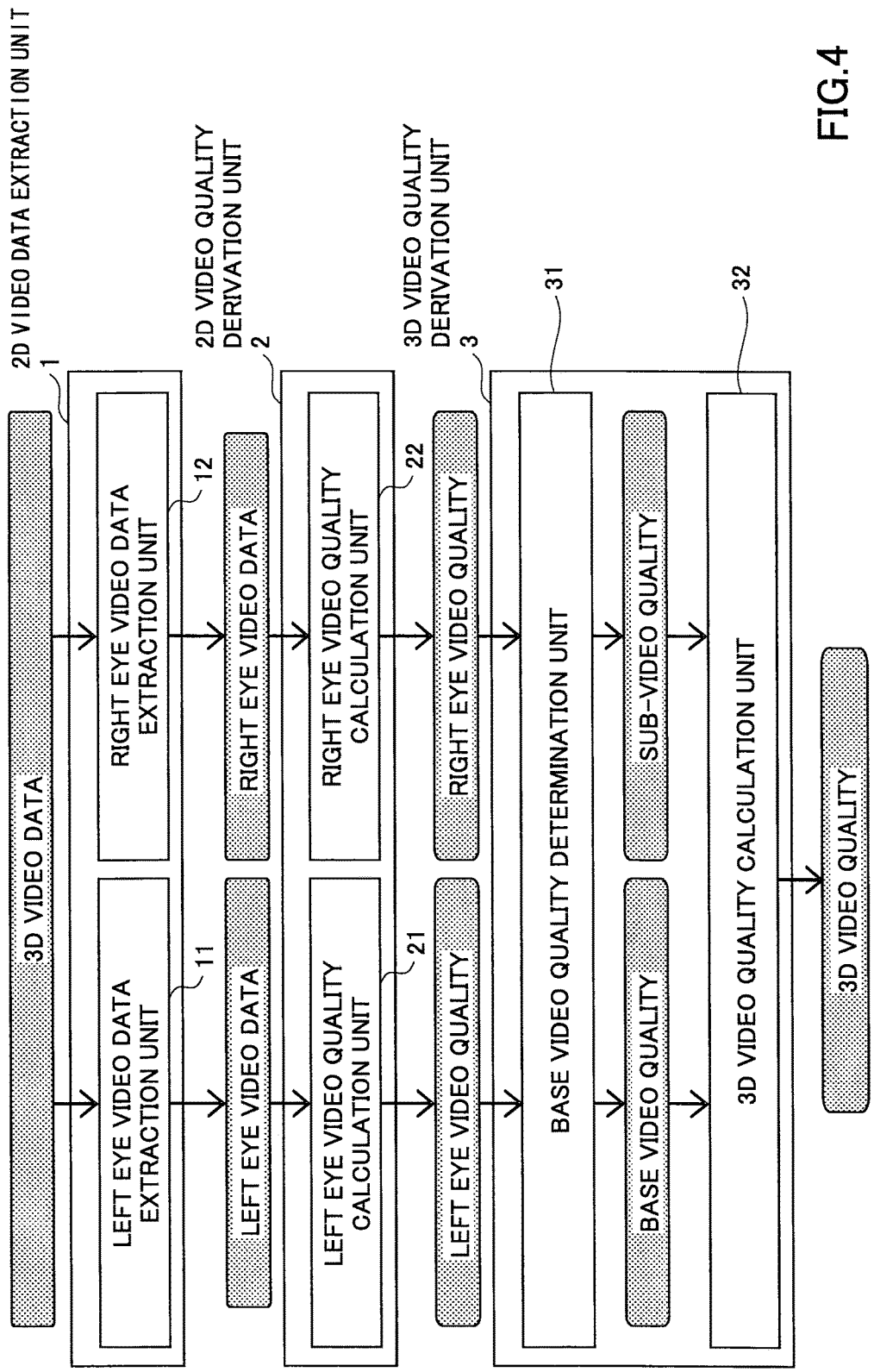
FIG. 4 is a block diagram of a video quality evaluation apparatus in an embodiment of the present invention.

FIG. 4 shows a configuration of a video quality evaluation apparatus in an embodiment of the present invention.

The video quality evaluation apparatus shown in the figure includes a 2D video data extraction unit 1, a 2D video quality derivation unit 2, and a 3D video quality derivation unit 3, and the video quality evaluation apparatus receives 3D video data as an input and outputs a 3D video quality. In this embodiment, the 3D video data indicates a 3D video signal, a 3D video signal before information processing (coding process, transmission process and the like), or a packet including a 3D video signal or a combination of them.

The 2D video data extraction unit 1 includes a left eye video data extraction unit 11 and a right eye video data extraction unit 12.

Figure 5:
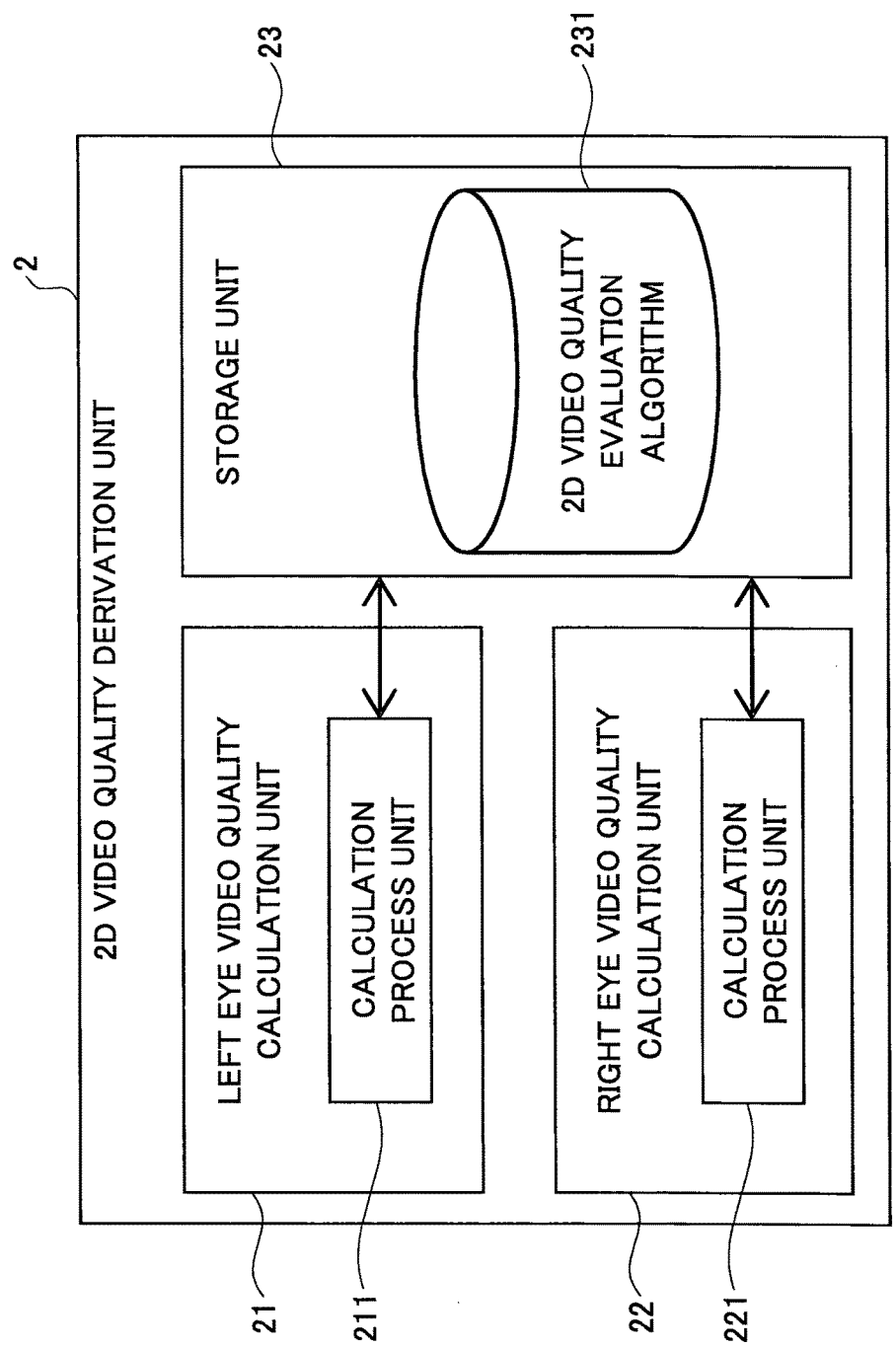
FIG. 5 is a block diagram of a 2D video quality derivation unit in an embodiment of the present invention.

As shown in FIG. 5, the 2D video quality derivation unit 2 includes a left eye video quality calculation unit 21, a right eye video quality calculation unit 22 and a storage unit 23 for storing a 2D video quality evaluation algorithm (program), and each of the left eye video quality calculation unit 21 and the right eye video quality calculation unit 22 includes calculation process units 211 and 221 respectively.

Figure 6:
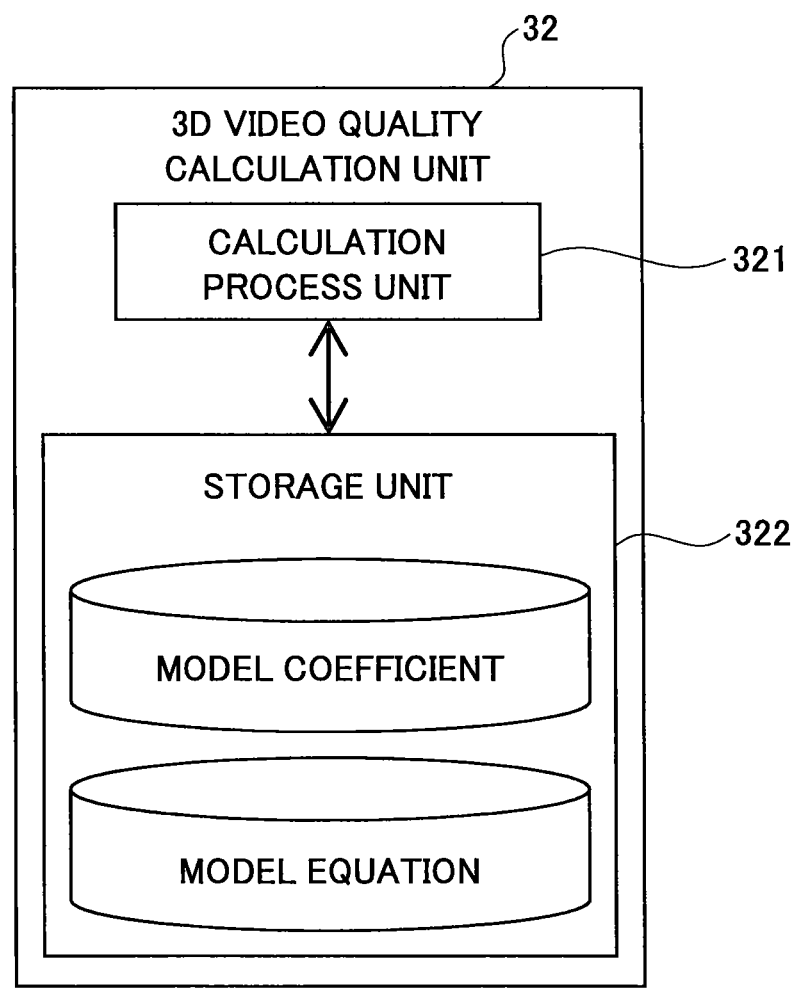
FIG. 6 is a block diagram of a 3D-video quality derivation unit in an embodiment of the present invention.

The 3D video quality derivation unit 3 includes a base video quality determination unit 31 and a 3D video quality calculation unit 32, and, as shown in FIG. 6, the 3D video quality calculation unit 32 includes a calculation process unit 321 and a storage unit 322.

The 3D video data supplied to the video quality evaluation apparatus is supplied to the left eye video data extraction unit 11 and the right eye video data extraction unit 12 in the 2D video data extraction unit 1.

The 2D video data extraction unit 1 receives the 3D video data as an input. The left eye video data extraction unit 11 extracts left eye video data based on the input 3D video data and outputs the left eye video data as an input to the left eye video quality calculation unit 21, and the right eye video data extraction unit 12 extracts right eye video data based on the input 3D video data and outputs the right eye video data as an input to the right eye video quality calculation unit 22.

The left eye video data extraction unit 11 extracts left eye video data included in the input 3D video data. The data structure of the 3D video data depends on a container format (AVI, MPEG and the like) of the input 3D video data. The 3D video data is not necessarily formed as a single piece of data, and there may be a case where data is separated beforehand between the left eye video and the right eye video. Also, the format of the extracted left eye video data depends on the video quality evaluation algorithm used in the 2D video quality derivation unit 2, and the left eye video data may be a video signal of the left eye video, packet header information, packet bit stream information or the like. In a case where the video signal included in the input 3D video data is encoded and the video signal is used as the left eye video data, it is necessary that the left eye video data extraction unit 11 has a decoding function. But, as an embodiment, it is desirable that the apparatus is implemented assuming that the video signal is decoded before input.

The right eye video data extraction unit 12 extracts right eye video data included in the input 3D video data. The data structure of the 3D video data depends on a container format (AVI, MPEG and the like) of the input 3D video data. The 3D video data is not necessarily formed as a single piece of data, and there may be a case where data is separated beforehand between the left eye video and the right eye video. Also, the format of the extracted right eye video data depends on the video quality evaluation algorithm used in the 2D video quality derivation unit 2, and the right eye video data may be a video signal of the right eye video, packet header information, packet bit stream information or the like. In a case where the video signal included in the input 3D video data is encoded and the video signal is used as the right eye video data, it is necessary that the right eye video data extraction unit 12 has a decoding function. But, as an embodiment, it is desirable that the apparatus is implemented assuming that the video signal is decoded before input.

The 2D video quality derivation unit 2 receives the left eye video data and the right eye video data as inputs, and the left eye video quality calculation unit 21 calculates left eye video quality based on the input left eye video data, and outputs the left eye video quality as an input to the base video quality determination unit 31. The right eye video quality calculation unit 22 calculates right eye video quality based on the input right eye video data, and outputs the right eye video quality as an input to the base video quality determination unit 31.

The left eye video quality calculation unit 21 calculates a left eye video quality from the input left eye video data by using an existing 2D video quality evaluation algorithm described in the non-patent documents 1-4, for example. As shown in FIG. 5, the video quality evaluation algorithm is stored in the storage unit 23 as a program, and is referred to by the calculation process unit 211 of the left eye video quality calculation unit 21. The format of the input 3D video data and units of evaluation (such as units of packets, frames, any time units (every 10 seconds, for example), whole video, and the like) depend on the video quality evaluation algorithm to be used.

The right eye video quality calculation unit 22 calculates a right eye video quality from the input right eye video data by using an existing 2D video quality evaluation algorithm described in the non-patent documents 1-4, for example. As shown in FIG. 5, the video quality evaluation algorithm is stored in the storage unit 23 as a program, and is referred to by the calculation process unit 221. The format of the input 3D video data and units of evaluation (such as units of packets, frames, any time units (every 10 seconds, for example), whole video, and the like) depend on the video quality evaluation algorithm to be used.

The 3D video quality derivation unit 3 receives the left eye video quality and the right eye video quality as inputs, and the base video quality determination unit 31 calculates a base video quality and a sub-video quality based on the input left eye video quality and the input right eye video quality, and outputs the base video quality and the sub-video quality as an input to the 3D video quality calculation unit 32. Then, based on the input base video quality and the sub-video quality, the 3D video quality calculation unit 32 calculates a 3D video quality by using a model equation that is defined based on experimental results on effects that are exerted on the 3D video by the 2D video qualities of the left eye video and the right eye video of the 3D video.

The base video quality determination unit 31 determines higher one of the input left eye video quality and the right eye video quality to be the base video quality, and determines lower one of them as the sub-video quality. When the values of the left eye video quality and the right eye video quality are the same, although either one of the left eye video quality and the right eye video quality may be referred to as the base video quality or the sub-video quality, the left eye video quality is determined to be the base video quality and the right eye video quality is determined to be the sub-video quality in the present embodiment. Also, depending on 3D video services, it can be considered that there is a case in which the left eye video quality or the right eye video quality is assumed to be always higher than the other one. In such a case, the determination process may be omitted, and the quality of one video may be uniquely set to be the base video quality, and another one may be set to be the sub-video quality.

The 3D video quality calculation unit 32 calculates a 3D video quality VQ from the base video quality BQ and the sub-video quality SQ by using the following model equation (1).

$$VQ = v_1 \cdot BQ - v_2 \cdot (BQ - SQ) + v_3 \quad (1)$$

In the equation, $v_1$, $v_2$ and $v_3$ are coefficients, and it is necessary to optimize the model equation (1) based on the least-square method and the like by using a 3D video quality, a base video quality and a sub-video quality that are obtained by subjective quality evaluation experiment and the like beforehand. This model equation (1) calculates the 3D video quality based on the base video quality, and the model equation (1) models a relationship in which the 3D video quality gradually falls as the difference value between the base video quality and the sub-video quality becomes large.

In addition, any one of the following model equations may be used instead of (1).

$$VQ = v_4 \cdot BQ \cdot \exp((BQ - SQ)/v_5) \quad (2)$$

$$VQ = v_6 \cdot BQ \cdot \exp((SQ/BQ)/v_7) \quad (3)$$

$$VQ = v_8 \cdot BQ - v_9 \cdot (SQ/BQ) + v_{10} \quad (4)$$

$$VQ = v_{11} \cdot BQ + \sum_{j=1}^{N_1} (v_{12}[j] \cdot (BQ - SQ)^j) + v_{13} \quad (5)$$

$$VQ = v_{14} \cdot Bq + \sum_{j=1}^{N_2} (v_{15}[j] \cdot (SQ/BQ)^j) + v_{16} \quad (6)$$

In the equations, $N_1$ and $N_2$ are any positive numbers, $v_{12}[j]$ and $v_{15}[j]$ are arrays having $N_1$, $N_2$ elements respectively. As to the degree of the equation indicated by the value of $N_1$ and $N_2$, it is confirmed by experiments that a positive number 2 provides high estimation accuracy as expected. Each of $v_4$, $v_5$, $v_6$, $v_7$, $v_8$, $v_9$, $v_{10}$, $v_{11}$, $v_{13}$, $v_{14}$, $v_{16}$, each element of $v_{12}[j]$ and each element of $v_{15}[j]$ is a coefficient, and it is necessary to optimize the model equations based on the least-square method and the like by using a 3D video quality, a base video quality and a sub-video quality that are obtained by subjective quality evaluation experiment and the like beforehand. These model equations (2)-(6) calculate the 3D video quality based on the base video quality, and the model equations model a relationship in which the 3D video quality gradually falls as the difference value between the base video quality and the sub-video quality becomes large or as a ratio between the base video quality and the sub-video quality becomes small. Also, the model equations (5) and (6) consider a relationship in which a difference value between the 3D video quality and the base video quality becomes large nonlinearly toward a minus direction as the difference value between the base video quality and the sub-video quality becomes small or a ratio between the base video quality and the sub-video quality becomes small. The model equations (5) and (6) can estimate the 3D video quality with higher accuracy than the model equations (1)-(4). The model equations and the model coefficients are stored in the storage unit 322 as shown in FIG. 6 as a program and data to be used by the program, and are referred to by the calculation process unit 321.

Figure 7:
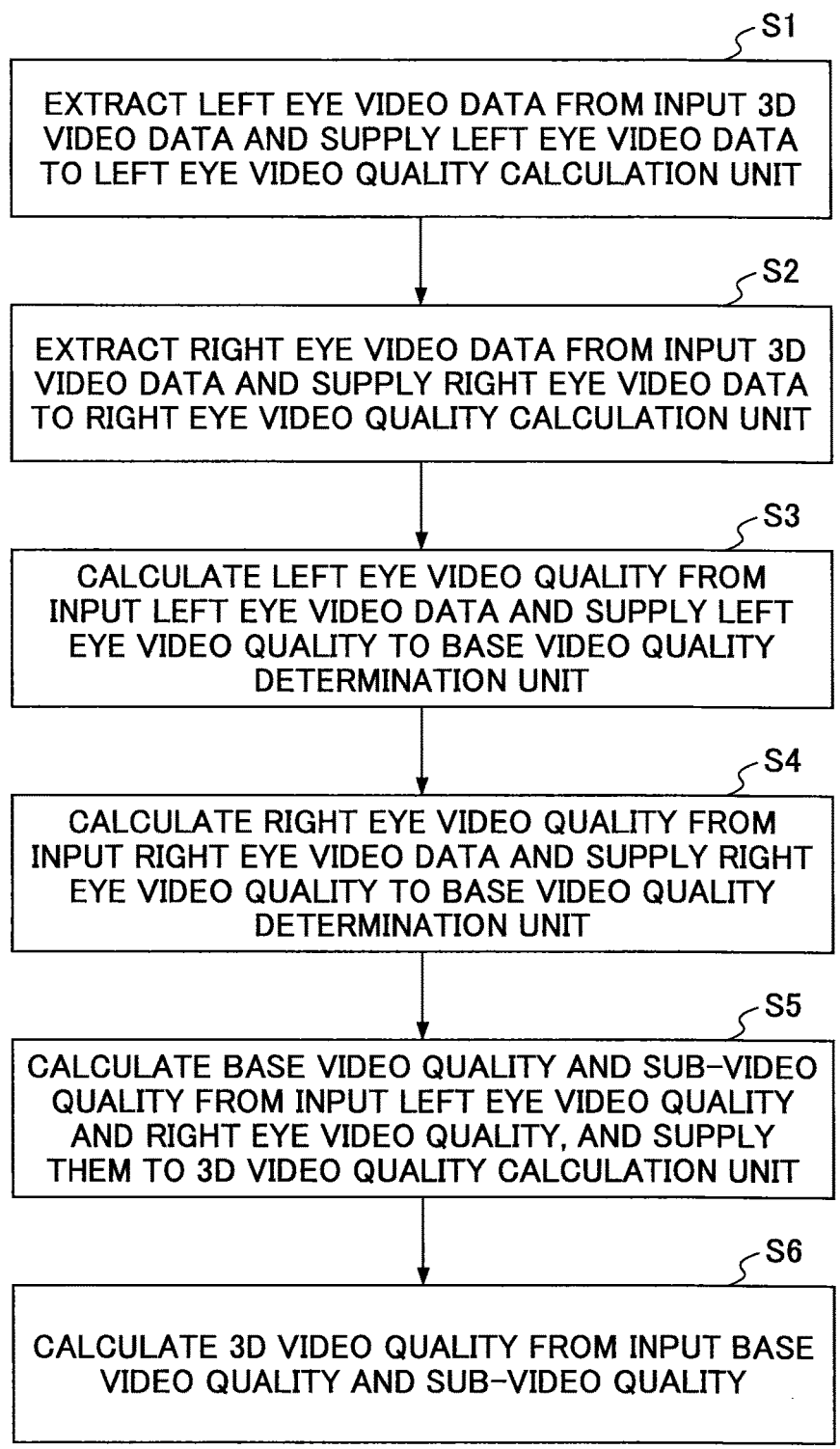
FIG. 7 is a flowchart of video quality evaluation in an embodiment of the present invention.

Next, a process flow of the present embodiment is described with reference to a flowchart of FIG. 7.

The left eye video data extraction unit 11 extracts left eye video data (video signal, packet header information, packet stream information of the left eye) from the input 3D video data and supplies the left eye video data to the left eye video quality calculation unit 21 (step 1).

The right eye video data extraction unit 12 extracts right eye video data (video signal, packet header information, packet stream information of the right eye) from the input 3D video data and supplies the right eye video data to the right eye video quality calculation unit 22 (step 2).

The left eye video quality calculation unit 21 calculates the left eye video quality from the input left eye video data by using a 2D video evaluation algorithm, and supplies the left eye video quality to the base video quality determination unit 31 (step 3).

Next, the right eye video quality calculation unit 22 calculates the right eye video quality from the input right eye video data by using a 2D video evaluation algorithm, and supplies the right eye video quality to the base video quality determination unit 31 (step 4).

Then, the base video quality determination unit 31 determines higher one of the input left eye video quality and the right eye video quality to be the base video quality, and determines lower one of them as the sub-video quality, and supplies them to the 3D video quality calculation unit 32 (step 5).

Finally, the 3D video quality calculation unit 32 calculates the 3D video quality from the input base video quality and the sub-video quality by using a predetermined model equation (step 6).

It is possible to construct each operation of the constituent elements of the video quality evaluation apparatus shown in FIG. 4 as a program, and to install and run the program in a computer used as a video processing apparatus, or to circulate the program via a network.

That is, the video quality evaluation apparatus shown in FIG. 4 can be realized by causing one or a plurality of computers to execute a program describing processing content described in the present embodiment, for example. More specifically, functions of each unit of the video quality evaluation apparatus can be realized by executing a program corresponding to processes performed by each unit, by using hardware resources such as a CPU, a memory and a hard disk included in the computer that forms the video quality evaluation apparatus.

That is, as an embodiment of the present invention, a program is provided for causing a computer to function as a video quality evaluation apparatus for evaluating a video quality that a user experiences for a service in which a 3D video is used, wherein the program causes the computer to function as: the 2D video quality derivation unit 2 configured to derive, from input 3D video data that is 3D video data which is input, a left eye video quality that is a quality of a left eye video that is included in the 3D video data and a right eye video quality that is a quality of a right eye video that is included in the 3D video data; and the 3D video quality derivation unit 3 configured to derive a 3D video quality from the left eye video quality and the right eye video quality. Also, in a case where a 2D video quality derivation unit 2 is realized by using an existing technique, as an embodiment of the present invention, a program, may be provided for causing a computer to function as the 3D video quality derivation unit 3 configured to derive a 3D video quality from the left eye video quality and the right eye video quality.

It is possible to preserve and distribute the program by recording the program in a computer readable recording medium. Also, it is possible to provide the program via a network such as the Internet and an email. As the recording medium, there are RAM (Random Access Memory), flash memory, ROM (Read Only Memory), EPROM (Erasable Programmable ROM), EEPROM (Electronically Erasable and Programmable ROM), register, hard disk, SD card, removable disk, CD-ROM and the like, for example.

The present invention is not limited to the specifically disclosed embodiments, and variations and modifications may be made without departing from the scope of the claims.

The present international application claims priority based on Japanese patent application No. 2011-265991 filed on Dec. 5, 2011, and Japanese patent application No. 2012-147276 filed on Jun. 29, 2012, and the entire contents of the Japanese patent applications No. 2011-265991, and No. 2012-147276 are incorporated herein by reference.

DESCRIPTION OF REFERENCE SIGNS 1 2D video data extraction unit
2 2D video quality derivation unit
3 3D video quality derivation unit
11 left eye video data extraction unit
12 right eye video data extraction unit
21 left eye video quality calculation unit
22 right eye video quality calculation unit
23 storage unit
31 base video quality determination unit
32 3D video quality calculation unit
211, 221 calculation process unit
321 calculation process unit
322 storage unit

The invention claimed is:

1. A video quality evaluation apparatus for evaluating a video quality that a user experiences for a service in which a 3D video is used, the video quality evaluation apparatus comprising:
processing circuitry configured to
derive, from input 3D video data, a left eye video quality that is a quality of a left eye video that is included in the 3D video data and a right eye video quality that is a quality of a right eye video that is included in the 3D video data; and
derive a 3D video quality of the 3D video from the left eye video quality and the right eye video quality by:
determining a higher one of the left eye video quality and the right eye video quality to be a base video quality, and to determine a lower one of the left eye video quality and the right eye video quality to be a sub-video quality, and
setting a model equation representing a relationship among the base video quality, the sub-video quality and the 3D video quality, and calculating a value of the 3D video quality from the base video quality and the sub-video quality based on the model equation,
wherein the model equation is one of the following:

$$VQ = v_1 \cdot BQ - v_2 \cdot (BQ - SQ) + v_3, \quad (1)$$

$$VQ = v_4 \cdot BQ \cdot \exp((BQ - SQ)/v_5), \quad (2)$$

$$VQ = v_6 \cdot BQ \cdot \exp((SQ/BQ)/v_7), \quad (3)$$

$$VQ = v_8 \cdot BQ - v_9 \cdot (SQ/BQ) + v_{10}, \quad (4)$$

$$VQ = v_{11} \cdot BQ + \sum_{j=1}^{N_1} (v_{12}[j] \cdot (BQ - SQ)^j) + v_{13}, \text{ and} \quad (5)$$

$$VQ = v_{14} \cdot BQ + \sum_{j=1}^{N_2} (v_{15}[j] \cdot (SQ/BQ)^j) + v_{16}, \quad (6)$$

where VQ is the 3D video quality, BQ is the base video quality, SQ is the sub video quality, and $v_1$, $v_2$, $v_3$, $v_4$, $v_5$, $v_6$, $v_7$, $v_8$, $v_9$, $v_{10}$, $v_{11}$, $v_{13}$, $v_{14}$ and $v_{16}$ are predetermined coefficients, $v_{12}[j]$ and $v_{15}[j]$ are arrays having $N_1$, $N_2$ elements respectively where each element of $v_{12}[j]$ and each element of $v_{15}[j]$ is a coefficient.

2. The video quality evaluation apparatus as claimed in claim 1, the processing circuitry being further configured to:
calculate the left eye video quality from left eye video data included in the input 3D video data by using a 2D video quality evaluation algorithm; and
calculate the right eye video quality from right eye video data included in the input 3D image data by using a 2D video quality evaluation algorithm.

3. A video quality evaluation method in an apparatus for evaluating a video quality that a user experiences for a service in which a 3D video is used, the video quality evaluation method comprising:
deriving, from input 3D video data, a left eye video quality that is a quality of a left eye video that is included in the 3D video data and a right eye video quality that is a quality of a right eye video that is included in the 3D video data; and
deriving a quality of the 3D video from the left eye video quality and the right eye video quality by:
determining higher one of the left eye video quality and the right eye video quality to be a base video quality, and to determine lower one of the left eye video quality and the right eye video quality to be a sub-video quality, and
setting a model equation representing a relationship among the base video quality, the sub-video quality and the 3D video quality, and calculating a value of the 3D video quality from the base video quality and the sub-video quality based on the model equation,
wherein the model equation is one of the following:

$$VQ = v_1 \cdot BQ - v_2 \cdot (BQ - SQ) + v_3, \quad (1)$$

$$VQ = v_4 \cdot BQ \cdot \exp((BQ - SQ)/v_5), \quad (2)$$

$$VQ = v_6 \cdot BQ \cdot \exp((SQ/BQ)/v_7), \quad (3)$$

$$VQ = v_8 \cdot BQ - v_9 \cdot (SQ/BQ) + v_{10}, \quad (4)$$

-continued $$VQ = v_{11} \cdot BQ + \sum_{j=1}^{N_1} (v_{12}[j] \cdot (BQ - SQ)^j) + v_{13}, \text{ and} \quad (5)$$

$$VQ = v_{14} \cdot BQ + \sum_{j=1}^{N_2} (v_{15}[j] \cdot (SQ/BQ)^j) + v_{16}, \quad (6)$$

where VQ is the 3D video quality, BQ is the base video quality, SQ is the sub video quality, and $v_1$, $v_2$, $v_3$, $v_4$, $v_5$, $v_6$, $v_7$, $v_8$, $v_9$, $v_{10}$, $v_{11}$, $v_{13}$, $v_{14}$ and $v_{16}$ are predetermined coefficients, $v_{12}[j]$ and $v_{15}[j]$ are arrays having $N_1$, $N_2$ elements respectively where each element of $v_{12}[j]$ and each element of $v_{15}[j]$ is a coefficient.

4. The video quality evaluation method as claimed in claim 3, further comprising:
calculating the left eye video quality from left eye video data included in the input 3D video data by using a 2D video quality evaluation algorithm; and
calculating the right eye video quality from right eye video data included in the input 3D video data by using a 2D video quality evaluation algorithm.

5. A non-transitory computer-readable recording medium storing a video quality evaluation program for causing a computer perform a video quality evaluation method for evaluating a video quality that a user experiences for a service in which a 3D video is used, the video quality evaluation method comprising:
deriving, from input 3D video data, a left eye video quality that is a quality of a left eye video that is included in the 3D video data and a right eye video quality that is a quality of a right eye video that is included in the 3D video data; and
deriving a quality of the 3D video from the left eye video quality and the right eye video quality by:
determining higher one of the left eye video quality and the right eye video quality to be a base video quality, and to determine lower one of the left eye video quality and the right eye video quality to be a sub-video quality, and
setting a model equation representing a relationship among the base video quality, the sub-video quality, and the 3D video quality, and calculating a value of the 3D video quality from the base video quality and the sub-video quality based on the model equation,
wherein the model equation is one of the following:

$$VQ = v_1 \cdot BQ - v_2 \cdot (BQ - SQ) + v_3, \quad (1)$$

$$VQ = v_4 \cdot BQ \cdot \exp((BQ - SQ)/v_5), \quad (2)$$

$$VQ = v_6 \cdot BQ \cdot \exp((SQ/BQ)/v_7), \quad (3)$$

$$VQ = v_8 \cdot BQ - v_9 \cdot (SQ/BQ) + v_{10}, \quad (4)$$

$$VQ = v_{11} \cdot BQ + \sum_{j=1}^{N_1} (v_{12}[j] \cdot (BQ - SQ)^j) + v_{13}, \text{ and} \quad (5)$$

$$VQ = v_{14} \cdot BQ + \sum_{j=1}^{N_2} (v_{15}[j] \cdot (SQ/BQ)^j) + v_{16}, \quad (6)$$

where VQ is the 3D video quality, BQ is the base video quality, SQ is the sub video quality, and $v_1$, $v_2$, $v_3$ $v_4$, $v_5$, $v_6$, $v_7$, $v_8$, $v_9$, $v_{10}$, $v_{11}$, $v_{13}$, $v_{14}$ and $v_{16}$ are predetermined coefficients, $v_{12}[j]$ and $v_{15}[j]$ are arrays having $N_1$, $N_2$ elements respectively where each element of $v_{12}[j]$ and each element of $v_{15}[j]$ is a coefficient.

\* \* \* \* \*